United States Patent [19]

Sebastian et al.

[11] Patent Number: 5,982,067
[45] Date of Patent: *Nov. 9, 1999

[54] BRUSHLESS DC MOTOR HAVING REDUCED TORQUE RIPPLE FOR ELECTRIC POWER STEERING

[75] Inventors: Tomy Sebastian, Saginaw; Steven James Collier-Hallman, Frankenmuth, both of Mich.

[73] Assignee: General Motors Corporation, Detroit, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/650,519

[22] Filed: May 20, 1996

[51] Int. Cl.$^6$ ........................................................ H02K 3/00
[52] U.S. Cl. .......................... 310/184; 310/179; 310/180
[58] Field of Search ..................... 310/179, 156, 310/185, 254, 184; 318/439, 138, 254, 811, 807

[56] References Cited

U.S. PATENT DOCUMENTS

| | | | |
|---|---|---|---|
| 3,601,642 | 8/1971 | Willyoung | 310/202 |
| 4,132,914 | 1/1979 | Khutoretsky et al. | 310/184 |
| 4,200,817 | 4/1980 | Bratoljic | 310/198 |
| 4,424,463 | 1/1984 | Musil | 310/49 R |
| 4,546,294 | 10/1985 | Ban et al. | 318/311 |

(List continued on next page.)

OTHER PUBLICATIONS

Investigation Into a Class of Brushless DC Motor W/Aqasisquare Voltages & Currents; H. R. Bolton & N. M. Mallinson; IEE Proceedings, vol. 133, Pt. B, No. 2; Mar. 1986.

Influence of Motor Design & Feed Current Waveform on Torque Ripple in Brushless DC Drives H. R. Bolton * R. A. Ashen; IEE Proceedings, vol. 131, Pt. B, No. 2; May 1984.

Evaluation of Brushless Permanent Magnet Motor Rotor Configurations for Square Wave Current Excitation; R. Vyas, S. Murthy, T. Sebastian; Proceedings–1996 Int'l Conference on Power Electronics Drive & Energy Systems for Industrial Growth; New Delhi, India; Jan. 1996 pp. 895–899.

*Primary Examiner*—Nestor Ramirez
*Assistant Examiner*—Tran N Nguyen
*Attorney, Agent, or Firm*—Robert M. Sigler; Edmund P. Anderson

[57] ABSTRACT

A brushless DC motor has a permanent magnet rotor comprising p magnetic poles and a stator having an integer multiple of 6*p*n slots containing windings, n being a positive, non-zero integer, and the poles and slots being skewed by one slot pitch with respect to each other. The windings in the slots are electrically connected in two separate groups of three-phase windings with each group having three phase terminals, the windings of each group being distributed in phase belts occupying alternate sectors of 30 electrical degrees and the windings of the first group alternating with the windings of the second group. Since the trapezoidal back EMF voltage curve has a wider top it exhibits less droop, compared with an equivalent three-phase brushless DC motor of the prior art, over the 60 electrical degree period centered on maximum back EMF in which torque producing current is applied. In addition, the maxima of back EMF voltage across pairs of terminals in the two groups of three phase windings are 30 electrical degrees out of phase with each other, so that variations in back EMF voltage in the two groups tend to cancel each other as torque producing current is applied to both groups. The result is significantly less torque ripple due to back EMF variation, compared with an equivalent three-phase brushless DC motor of the prior art, and less vibration coupled to the steering wheel of an electric power steering system in which the motor is used as a power assist actuator.

4 Claims, 10 Drawing Sheets

U.S. PATENT DOCUMENTS

| | | | |
|---|---|---|---|
| 4,551,645 | 11/1985 | Takashashi et al. | 310/46 |
| 4,703,211 | 10/1987 | Yazaki et al. | 310/179 |
| 4,882,524 | 11/1989 | Lee | 318/254 |
| 4,950,960 | 8/1990 | Krefta et al. | 318/254 |
| 4,960,178 | 10/1990 | Abukawa et al. | 180/79.1 |
| 5,006,745 | 4/1991 | Nishio et al. | 310/177 |
| 5,034,642 | 7/1991 | Hoemann et al. | 310/156 |
| 5,122,705 | 6/1992 | Kusase et al. | 310/68 D |
| 5,266,859 | 11/1993 | Stanley | 310/216 |
| 5,323,077 | 6/1994 | Brandes | 310/156 |
| 5,442,250 | 8/1995 | Stridsberg | 310/186 |
| 5,491,393 | 2/1996 | Uesugi | 318/439 |
| 5,506,776 | 4/1996 | Fushimi et al. | 364/424.05 |

BRUSHLESS DC MOTOR HAVING REDUCED TORQUE RIPPLE FOR ELECTRIC POWER STEERING

BACKGROUND OF THE INVENTION

The technical field of this invention is brushless DC motors, and particularly such motors optimized for use in a vibration sensitive environment such as an electric power steering system for a vehicle.

In a conventional three-phase, trapezoidal back EMF, brushless DC motor, the three phase windings are distributed on the stator surface over 6 phase belts of 60 electrical degrees each. The conductors for each phase belt are placed in a single or multiple slots over this 60 degrees. FIG. 2 shows a prior art example of such a motor 1 having a four pole PM rotor 2 and a stator 3 with windings for phases A, B and C placed in 12 stator slots 4 of 60 electrical degrees (30 mechanical degrees) each. FIG. 3 shows a motor 5 which is a prior art variation of motor 1 in FIG. 2. Motor 5 has a similar four pole rotor 6 and a stator 7 having twenty-four stator slots 8, with each slot comprising only 30 electrical degrees (15 mechanical degrees) but with windings in pairs of adjacent slots connected in the same phase, so that the windings for phases A, B and C are still each distributed over phase belts of 60 electrical degrees.

In order to reduce cogging torque in such motors, either the stator slots or the rotor magnets are skewed to produce a skew of one slot pitch therebetween axially across the stator. Under such conditions, assuming an ideal square wave flux distribution in the air gap and a nearly closed slot structure, the line-to-line back EMF waveform generated by the rotating rotor across each pair of phase terminals has a trapezoidal shape with a flat top indicating a constant value over a range of 60 electrical degrees. In an ideal case wherein each phase is excited by a constant current over 120 degrees, a ripple free torque would be produced. However, in reality, the flux distribution in the air gap is not a square wave; and this results in a line-to-line back EMF wave form which droops at each end of the 60 degree "flat" area. In FIG. 9, the actual back EMF curves $V_{cb}$, $V_{ab}$ and $V_{ac}$ of the motor of FIG. 3 are shown for a portion of a rotor rotation. The portions of the back EMF curves which produce motor torque, because current is provided through the indicated terminals, are shown as solid lines; and the remainder of the curves, which produce no torque, are shown as dashed lines. It can be seen that, from 60 to 120 electrical degrees, only curve $V_{ab}$ is active in generating torque. The solid line portion of curve $V_{ab}$ illustrates that the back EMF in this range is not constant: it achieves a maximum at 90 degrees and droops by about 12 percent of that maximum torque at 60 and 120 degrees. This occurs for each curve over the range of 60 electrical degrees of motor rotation in which it produces torque; and the result is a torque ripple which can be undesirable in some motor applications. In particular, such a motor used as a direct actuator in an electric power steering system for a motor vehicle will be mounted on and/or coupled to the vehicle steering column; and vibrations produced by the torque ripple may be conducted directly to the steering wheel, where they may be both apparent and annoying to the vehicle operator.

SUMMARY OF THE INVENTION

The invention is a brushless DC motor having a permanent magnet rotor comprising p magnetic poles and a stator having 6*p*n slots containing windings, where n is a positive, non-zero integer. The poles and slots are skewed relative to each other by one slot pitch axially across the stator. The windings in the slots are electrically connected in two separate groups of three-phase windings with each group having three phase terminals, the windings of each group being distributed in phase belts occupying alternate sectors of 30 electrical degrees and the windings of the first group alternating with the windings of the second group. The shorter slot pitch produces less droop in the back EMF voltage curve, compared with an equivalent three-phase brushless DC motor of the prior art, over the 60 electrical degree period centered on maximum back EMF in which torque producing current is applied. In addition, the maxima of back EMF voltage across pairs of terminals in the two groups of three phase windings are 30 electrical degrees out of phase with each other when torque producing current is applied to both groups, so that variations in back EMF voltage in the two groups tend to cancel each other. The result is significantly less torque ripple due to back EMF variation, compared with an equivalent three-phase brushless DC motor of the prior art, and less vibration coupled to the steering wheel of an electric power steering system in which the motor is used as a power assist actuator. In addition, the smaller droop in the back EMF curves result in greater total torque output for the same current and more starting torque. Although each set of three phase windings in the motor must be provided with a separate semiconductor switch bridge circuit, the cost of the additional semiconductor switches is considerably offset by a lower cost for each switch, since it needs to carry only half the current for a given motor torque. In addition, the lower currents generate less EMI as they are switched. The separately connected groups of three phase windings also allow the use of two standard three-phase controls, if desired, for ease of design and further reduced cost.

DESCRIPTION OF A PREFERRED EMBODIMENT

Figure 1:
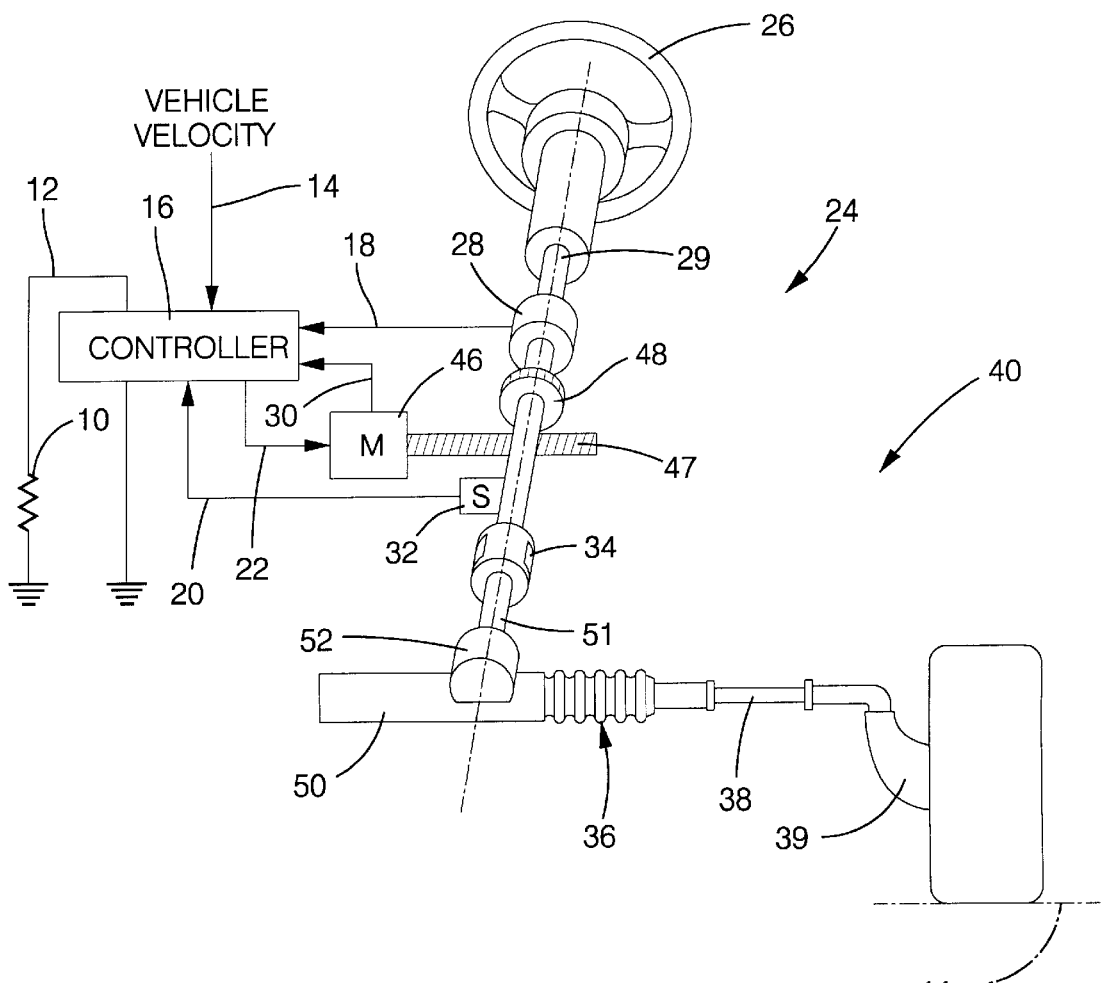
FIG. 1 is a schematic diagram of an electric power steering system using a brushless DC motor according to this invention.

Referring to FIG. 1, a motor vehicle 40 is provided with an electric power steering system 24. Electric power steering system 24 may comprise a conventional rack and pinion steering mechanism 36, which includes a toothed rack (not shown) and a pinion gear (not shown) under gear housing 52. As steering wheel 26 is turned, an upper steering shaft 29 turns a lower shaft 51 through a universal joint 34; and lower steering shaft 51 turns the pinion gear. Rotation of the pinion gear moves the rack, which moves tie rods 38 (only one shown), which move steering knuckles 39 (only one shown) to turn wheels 42 (only one shown).

Electric power assist is provided through a controller 16 and a power assist actuator comprising a motor 46. Controller 16 receives electric power from a vehicle electric power source 10 through a line 12, a signal representative of the vehicle velocity on line 14 and steering pinion gear angle from a rotational position sensor 32 on line 20. As steering wheel 26 is turned, a torque sensor 28 senses the torque applied to steering wheel 26 by the vehicle operator and provides an operator torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor phase currents and provides such currents through a bus 22 to motor 46, which supplies torque assist to steering shaft 29 through worm 47 and worm gear 48. Details of an exemplary embodiment of controller 16 may be found in one or more of the U.S. patent applications U.S. Ser. No. 08/537,605 Electric Power Steering Control, U.S. Ser. No. 08/538,155, Electric Power Steering Control, and U.S. Ser. No. 08/537,604 Electric Power Steering Control, all filed Oct. 2, 1995 and all assigned to the assignee of this application. Since motor 46 is mechanically coupled to steering wheel 26 for vibration transmission, any significant vibrations produced by motor 46 in operation may be felt by the vehicle operator.

Figure 4:
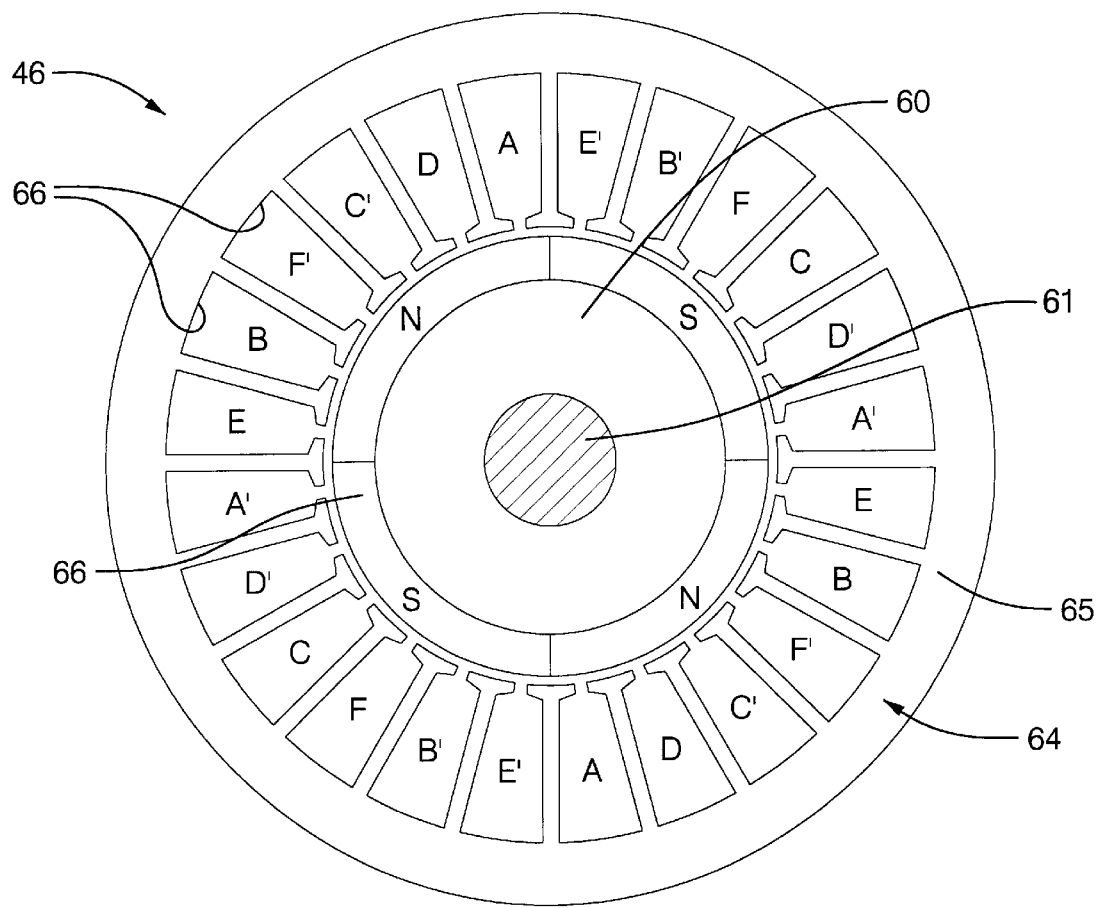
FIG. 4 is a cross-sectional view perpendicular to the axis of a preferred embodiment of a brushless DC motor according to this invention.

Referring to FIG. 4, a brushless DC motor 46 according to this invention has a four pole PM rotor 60 which is mounted on a shaft 61 and has four magnetic poles 63. A stator 64 comprises stacked laminations 65 defining twenty-four slots 66. Either rotor poles 63 or stator slots 66 are skewed from the motor axis in the normal manner so that rotor poles 63 and stator slots 66 are skewed with respect to each other by one slot pitch axially across the stator. It should be understood that, according to standard industry practice, the skew might be slightly more or less (up to 5%) than one slot pitch to compensate for certain fringing effects. Such variations in skew are intended to be included within the commonly understood meaning of the phrase "one slot pitch."

Two groups of three-phase windings are wound in slots 66. A first group of three-phase windings A, B and C are placed in alternate slots 66 (that is, every second slot) around stator 64, with each phase occupying a phase band of 30 electrical (15 mechanical) degrees and separated from each neighboring phase band of the A, B, C group by 30 electrical degrees. A second group of three-phase windings D, E and F are placed in the remaining alternate slots 66 not occupied by the windings of the A, B, C group, so that in counter-clockwise rotational order, for example, each phase of the first group (A, e.g.) is followed by the corresponding phase of the second group (D, e.g.). Each phase of the second group thus also occupies a phase belt of 30 electrical degrees and is separated from the neighboring phase belts of the D, E, F group by phase belts of the A, B, C group. The phase windings (A, D, C', F', B . . . etc.) are indicated in counter-clockwise order in FIG. 4.

Figure 5:
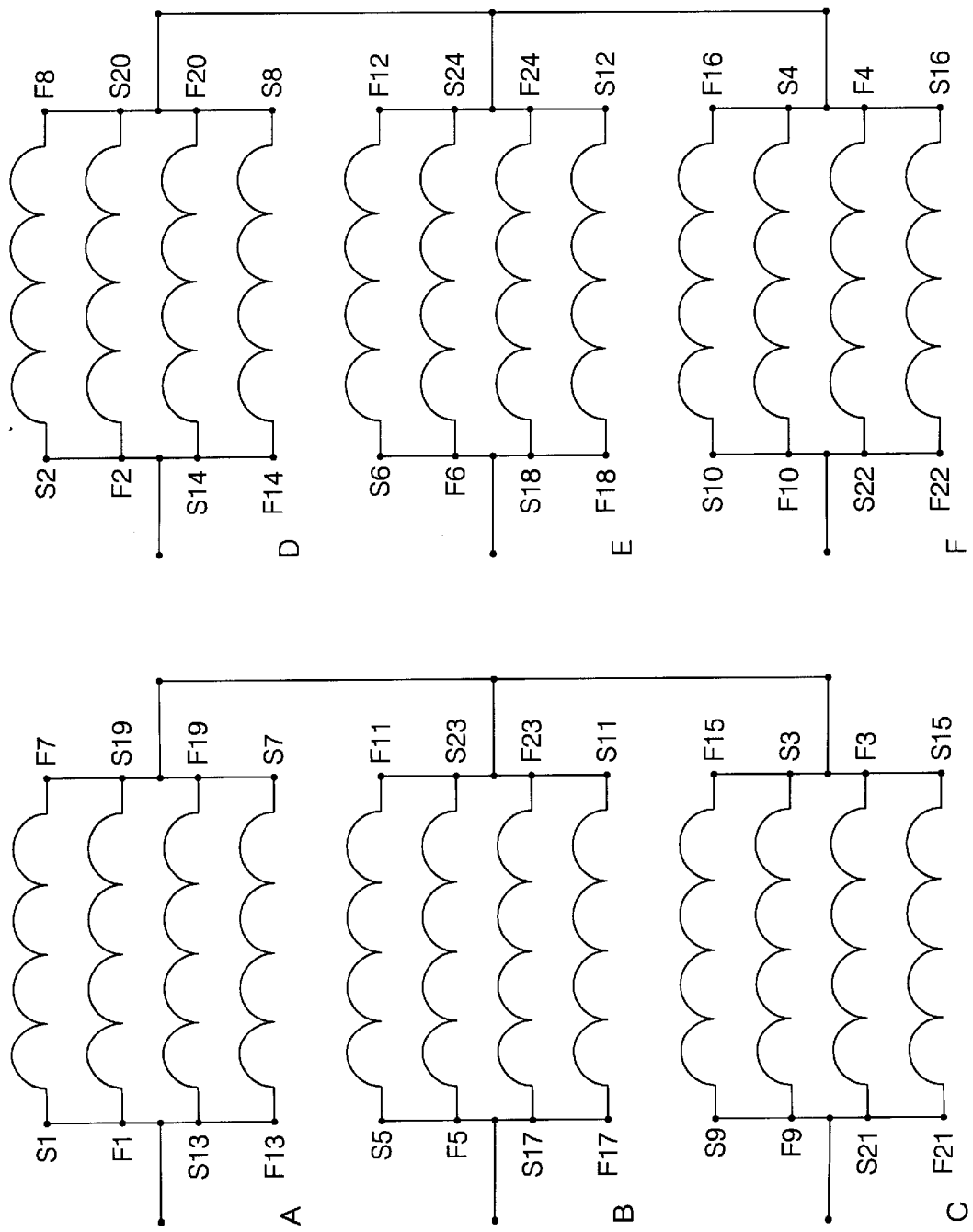
FIG. 5 shows the electrical connections of the phase windings and phase terminals in the motor of FIG. 4.

The electrical connections of the phase windings of motor 46 are shown in FIG. 5. Each set of terminals (A, B, C and D, E, F) is connected in a wye configuration. In this embodiment, the four windings of each phase are connected in parallel for a high current, low voltage application; but they could alternatively have been connected in series or in two series groups of parallel windings. The numbers at the ends of each winding denote the number of the slot, starting with the slot indicated "A" at the bottom of motor 46 in FIG. 4 as slot #1 and counting counter-clockwise, and indicate that the winding is routed through that slot. The letters "S" and "F" denote the start and finish, respectively, of a winding and indicate the winding direction (clockwise or counter-clockwise) and thus the direction of the magnetic poles produced by current therethrough. While the four windings for a phase are connected electrically in parallel, they are physically wound on the machine through four slots (e.g. #1, #7, #13, #19 for phase A) so that each consecutive winding spans 90 physical degrees around the stator and alternates in magnetic pole direction from the previous winding. Thus, each phase includes four windings which are arranged similarly to the four poles 63 of rotor 60.

Figure 6:
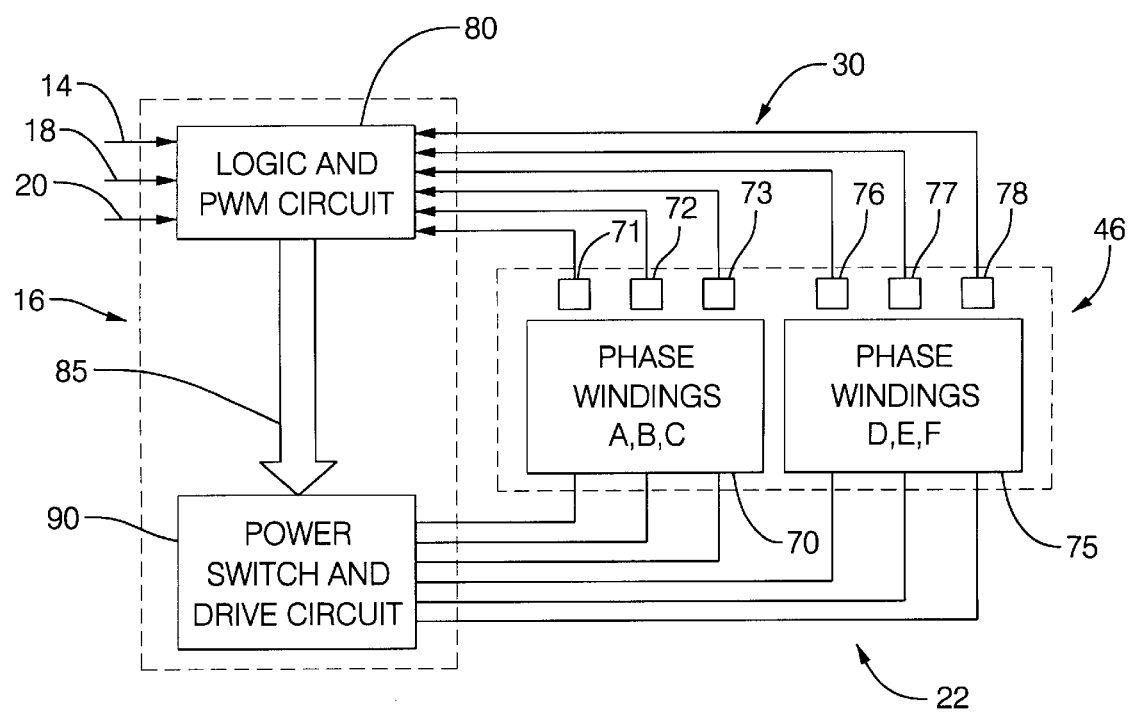
FIG. 6 shows a control arrangement for the motor of FIG. 4.

Controller 16 and motor 46 are shown in block diagram form in FIG. 6. Phase windings A, B and C of motor 46 form a first winding group 70 which may have three conventional Hall effect position sensors 71, 72 and 73 associated therewith. Phase windings D, E and F similarly form a second winding group 75 which may have three conventional Hall effect position sensors 76, 77 and 78 associated therewith. Hall effect sensors 71–73 and 76–78 provide rotor position signals for phases A–F over bus 30 to a logic and PWM circuit 80 of controller 16, which also receives the input signals on lines 14, 18 and 20. Logic and PWM circuit 80 determines the current levels and timings for the six motor phases. Circuit 80 outputs PWM switching signals over a bus 85, which comprises twelve lines, to power switch and drive circuit 90, which incorporates twelve semiconductor power switches controlled in pulse width modulation by the signals from logic and PWM circuit 80. The twelve power switches are arranged in a twelve switch bridge circuit comprising two conventional six switch bridge circuits, with the three outputs from one of the latter connected to phase terminals A, B and C of winding group 70 and the three outputs from the other connected to phase terminals D, E and F of winding group 75. Since the total torque produced by the motor is the sum of the currents provided by each of the bridge circuits, each of the latter needs to supply only half the current required. Thus, each of the semiconductor power switches only has to be able to switch half the current, for a given total motor torque, that would be required by such a switch if a single bridge circuit were used; and less expensive semiconductor power switches may be used. The resulting savings offset a significant portion of the additional cost of the circuitry required. In addition, the lower currents in each switch generate less EMI as they are switched.

Figure 11:
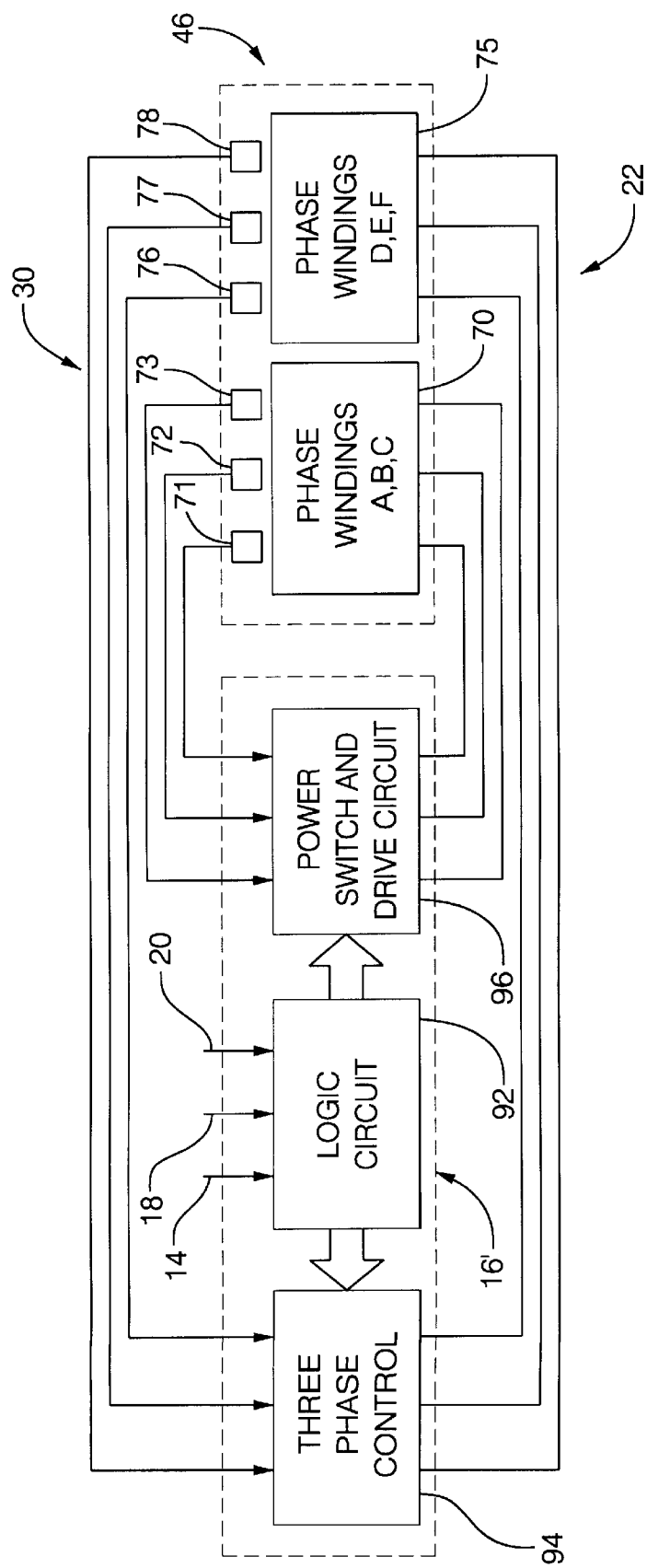
FIG. 11 shows an alternative control arrangement for the motor of FIG. 4.

An alternative control arrangement is shown in FIG. 11. This arrangement takes advantage of the electrically independent winding groups 70 and 75 to use commercially available, less expensive, three-phase controls for each group of windings. Control 16' comprises a logic circuit 92, which receives the external signals on lines 14, 18 and 20 and generates control (commanded speed, torque, etc.) signals as required for application to commercial three-phase controls 94 and 96. Three-phase control 94 receives the position signals from sensors 71–73 and provides output power to winding group 70; while three-phase control 96 receives the position signals from sensors 76–78 and provides output power to winding group 75. Although not shown, three-phase controls 94 and 96 receive electrical power from a battery or other electric power source in the conventional manner. It should be noted for the embodiments of FIG. 6 and 11 that, due to the fixed angular relationship between winding groups 70 and 75, the number of position sensors 71–73, 76–78 may be reduced for additional cost reduction as known in the art.

Since the wye connections of each group of three-phase windings (A, B, C and D, E, F) are not connected together, winding groups A, B, C and D, E, F do not share stator current. Thus, the current distribution of this motor is different from that of a conventional six-phase motor, which would have a common connection for all six phases. This motor is essentially a variation of a three-phase motor having two sets of windings offset from each other. Due to this distribution of windings in two independent, offset groups of three phases, the slot pitch, and therefore the skew, of the motor corresponds to 30 electrical degrees; and the torque producing currents in the windings of each group are offset from those in the other group. Each of these facts is significant in reducing torque ripple in the motor of this invention.

Figure 2:
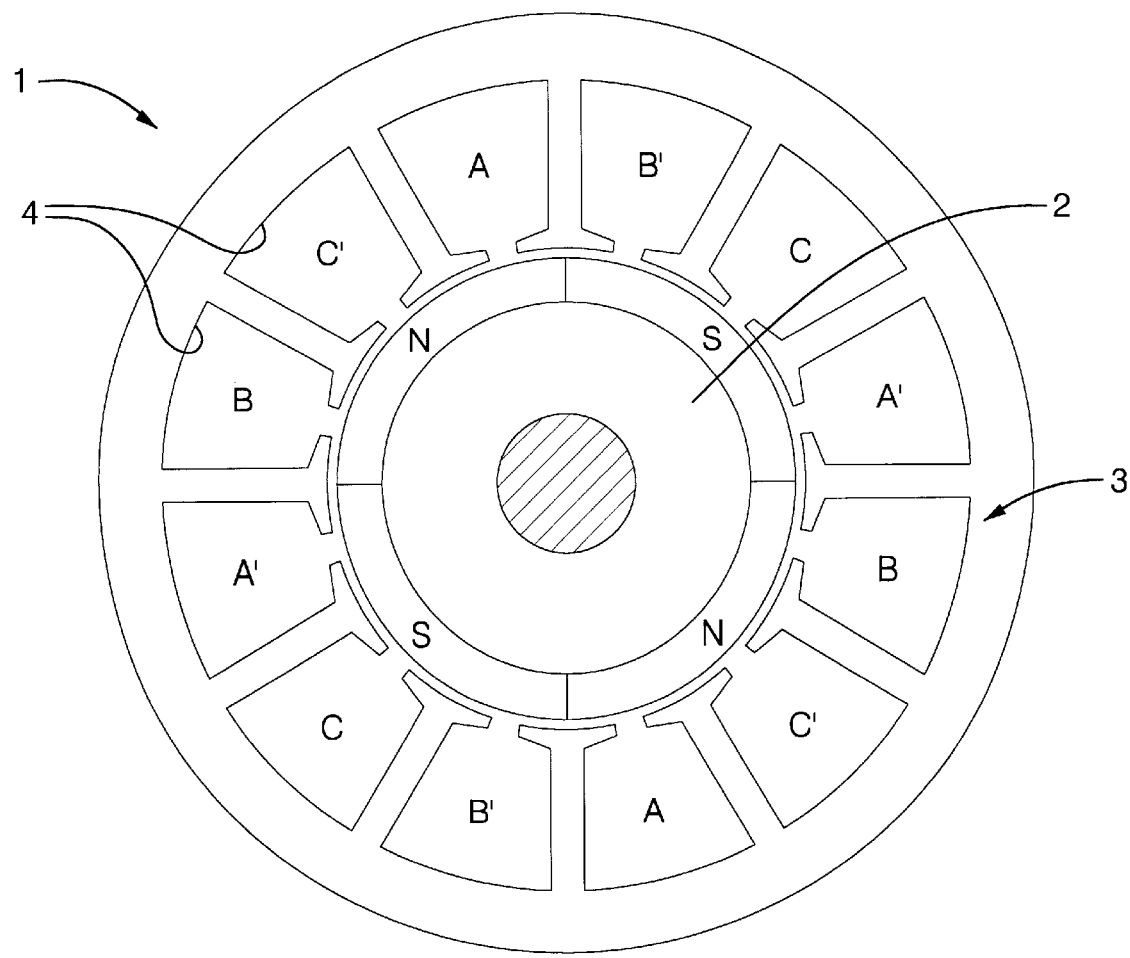
FIG. 2 is a cross-sectional view perpendicular to the axis of a three-phase brushless DC motor of the prior art.
Figure 3:
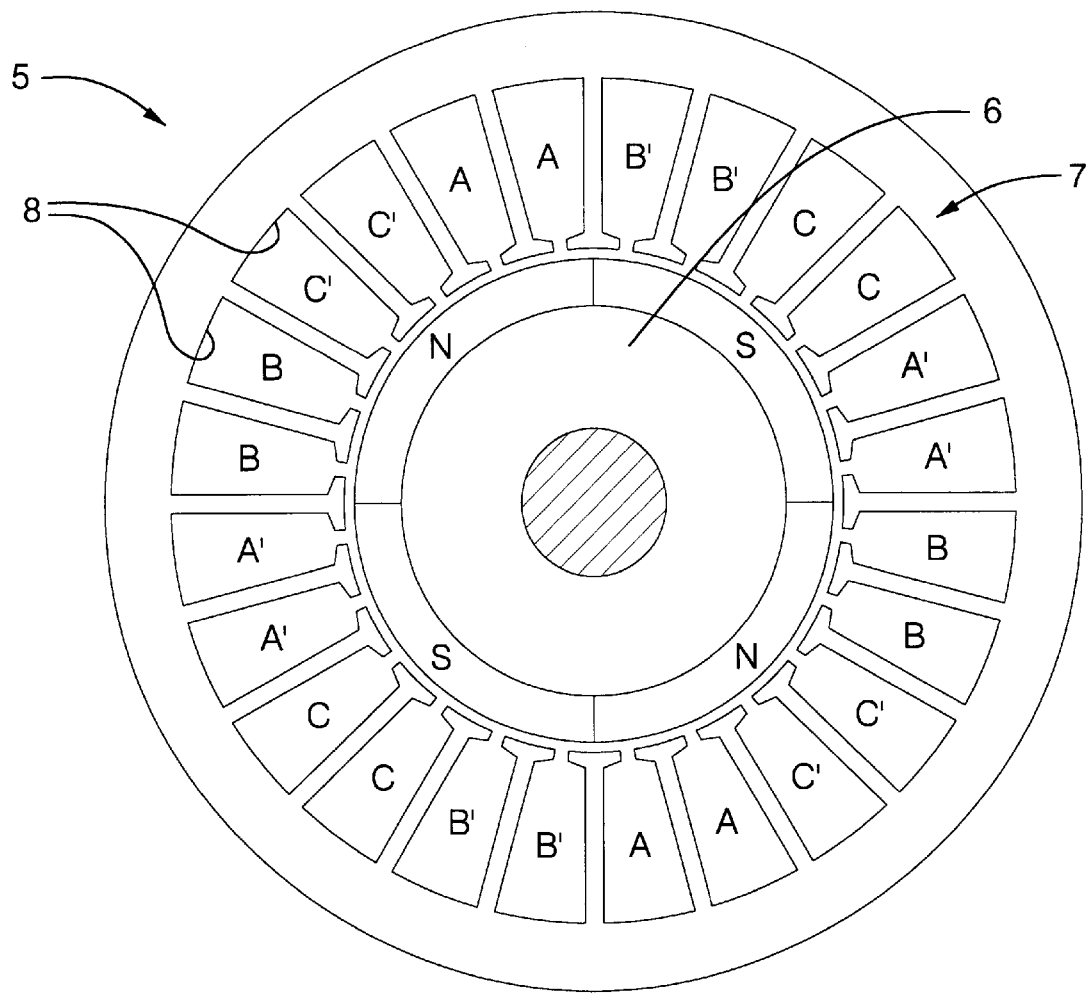
FIG. 3 is a cross-sectional view perpendicular to the axis of another three-phase brushless DC motor of the prior art.
Figure 7:
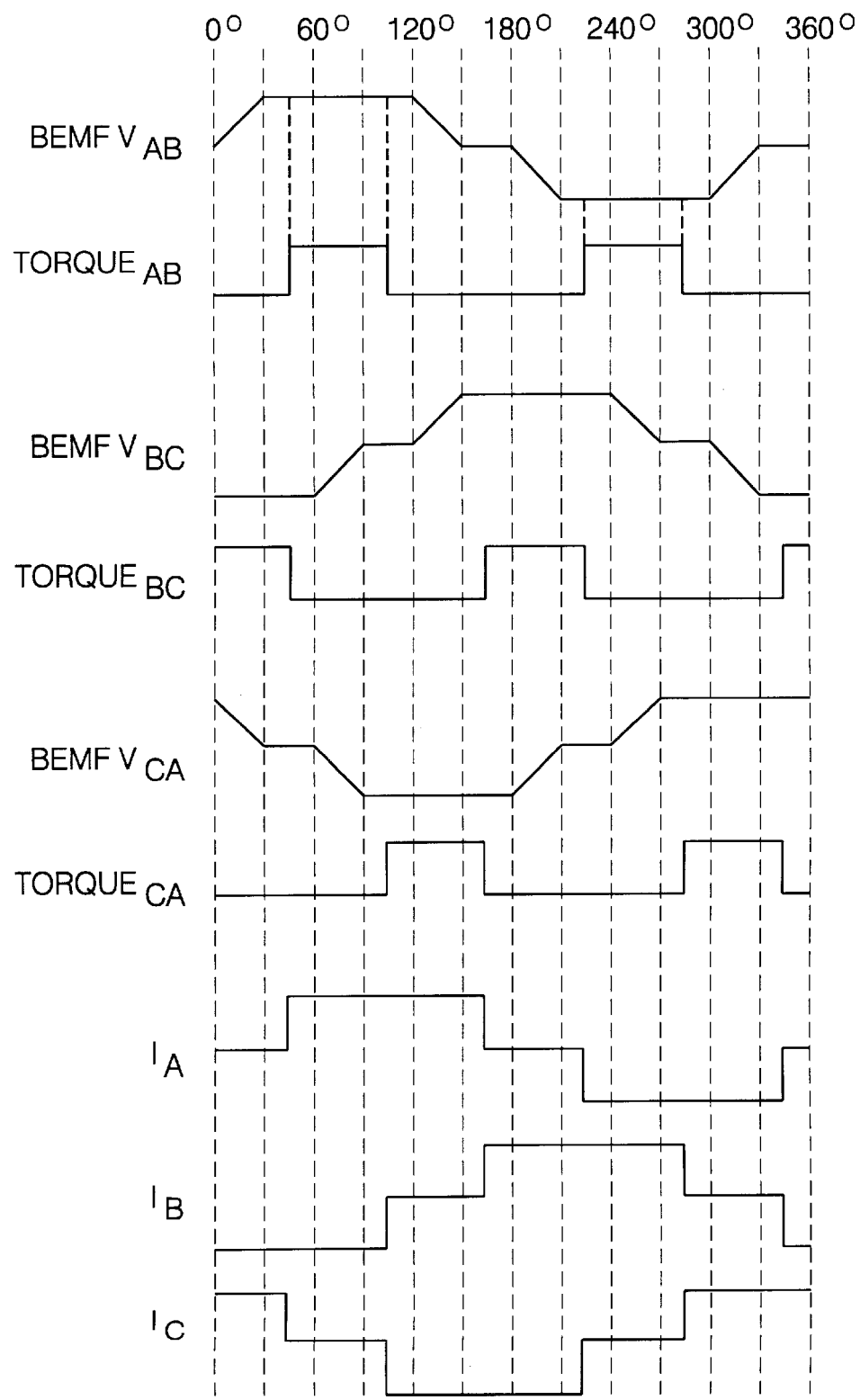
FIG. 7 shows idealized back EMF, torque and phase current curves illustrating the operation of phases A, B and C of the motor of FIG. 4.
Figure 8:
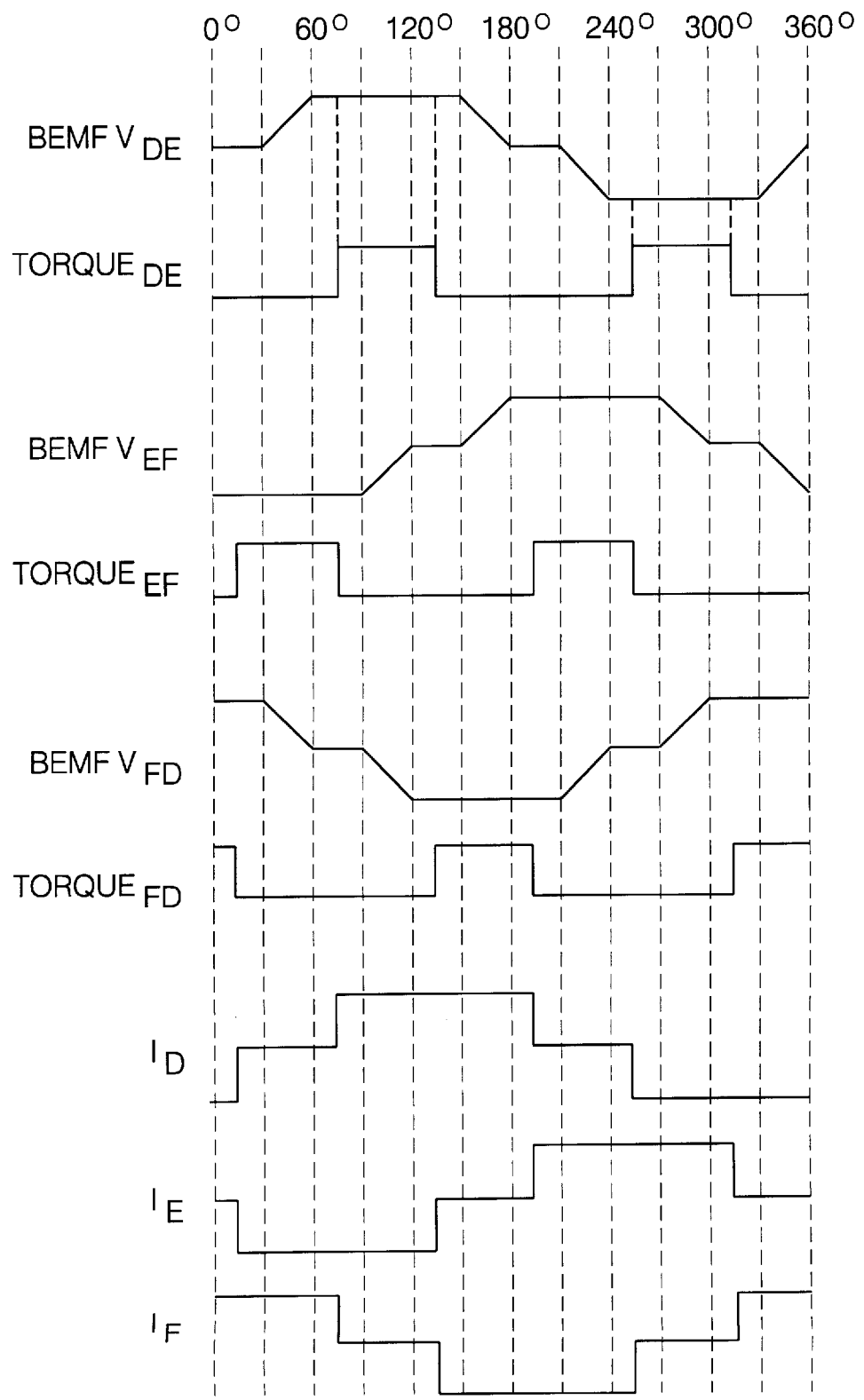
FIG. 8 shows idealized back EMF, torque and phase current curves illustrating the operation of phases D, E and F of the motor of FIG. 4.

FIG. 7 and 8 show idealized curves illustrating the operation of motor 46 of FIG. 4, with FIG. 7 showing phases A, B and C and FIG. 8 showing phases D, E and F. Referring to FIG. 7, the curves represent a complete 360 degree electrical cycle of the motor which, the motor having four rotor poles and twenty-four slots, will occur twice during each complete rotor rotation. The curve labeled BEMF $V_{ab}$ represents the back EMF generated by rotor 60 across motor terminals A and B through one complete electrical cycle. This back EMF increases over the range 0 to 30 electrical degrees due to the motor skew. It then remains (ideally) constant for 90 electrical degrees (from 30 to 120 degrees) before decreasing to zero at 150 electrical degrees, once again due to motor skew, and remaining constantly zero from there to 180 electrical degrees. The pattern then repeats in a negative or inverse direction, with a constant negative value for 90 degrees (from 210 to 300 degrees) while the opposite magnetic pole of the rotor passes the windings. Thus, due to the fact that the rise in back EMF due to motor skew occurs over a shorter rotational angle (30 electrical degrees rather than the 60 electrical degrees in prior art motors 1 and 5 in FIG. 2 and 3, respectively), the ideal flat top portion of the trapezoid extends over 90 degrees rather than 60 degrees, as in the prior art motors 1 and 5.

The curve labeled TORQUE$_{ab}$ represents the torque produced with this back EMF as current is provided from terminal A to terminal B during a 60 degree period from 45 to 105 electrical degrees and during a 60 degree period from 225 to 285 electrical degrees. Examination of similar curves for the other two phases shows that, ideally, a constant, unidirectional torque over the full 360 electrical degrees will result. Curves $i_a$, $i_b$ and $i_c$ below show the terminal currents required to produce this result, with each current being defined as current into the terminal. FIG. 8 shows similar ideal curves for phases D, E and F referenced to the same 360 degree cycle as the curves of FIG. 7; and the curves of FIG. 8 can be seen to lag the corresponding curves of FIG. 7 by 30 electrical degrees.

Figure 9:
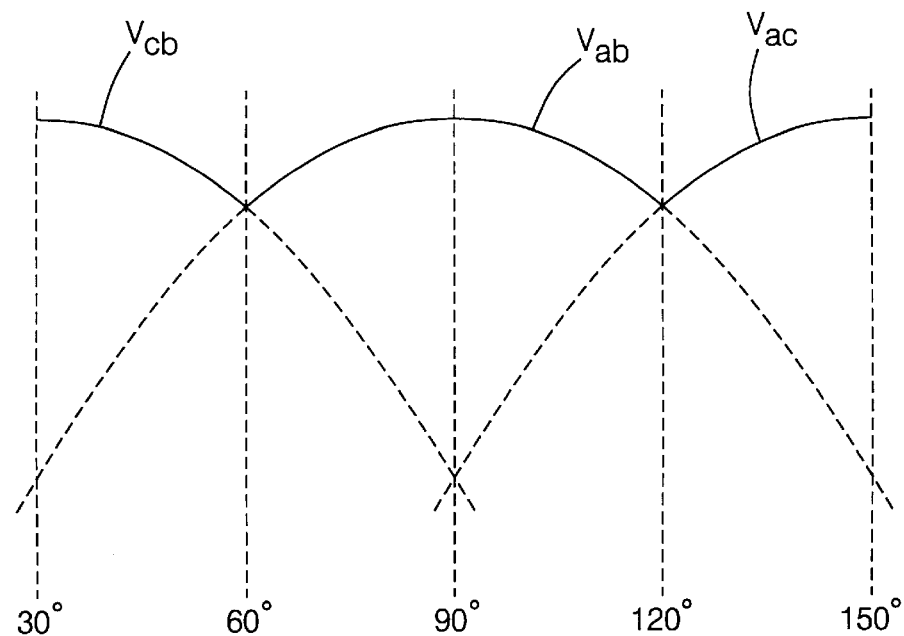
FIG. 9 shows actual back EMF curves over a 120 electrical degree rotor rotation in the prior art motor of FIG. 3.
Figure 10:
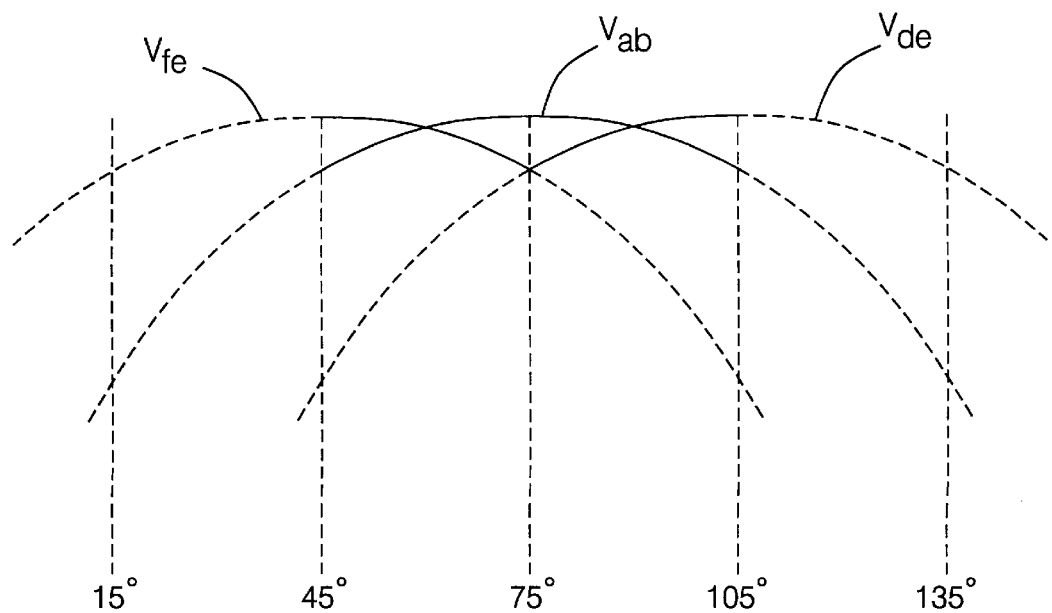
FIG. 10 shows actual back EMF curves over a 60 electrical degree rotor rotation in the motor of FIG. 4.

The actual back EMF curves for motor 46 of FIG. 4 are partially shown in FIG. 10 referenced to the same 360 degree cycle as the curves of FIG. 7 and 8. These curves can be compared to the actual curves from FIG. 7 and 8, with $V_{fe}$ in FIG. 10 being an inversion of the back EMF curve for $V_{ef}$ in FIG. 8. The curves of FIG. 10 are not actually constant over their 90 degree "constant" maximum and minimum ranges, such as from 30 to 120 electrical degrees or from 210 to 300 electrical degrees in curve BEMF $V_{ab}$ in FIG. 7. As in the prior art curves of FIG. 9, they exhibit a maximum value in the center of the range and droop on each side to the end of the range. However, current is only applied by controller 16 to motor 46 to produce torque over the middle 60 degrees of the total 90 degree range, centered on the position of maximum back EMF; and over this 60 degree range the droop is only half as great as that of the prior art motors over the same range: 6 percent of maximum torque rather than the 12 percent of the prior art motor 20. This alone produces a factor of two reduction in torque ripple.

However, the actual reduction in torque ripple is even greater than this in the arrangement of motor 46. Because each of the phase groups A, B, C and D, E, F is producing torque over the full 360 electrical degree cycle, there are always four phases producing torque—two from each group—and the total torque produced by the motor is the sum of the torques produced by these four phases. In addition, since there is a 30 degree lag in phases D, E and F with respect to the corresponding phases A, B and C, the maximum and minimum torques produced by the phases from each group are shifted in phase with respect to each other by 30 electrical degrees. Referring to FIG. 10, curves $V_{fe}$ and $V_{ab}$ both contribute to torque during the period from 45 to 75 degrees, with $V_{fe}$ achieving a maximum at 45 degrees and decreasing to about 0.94 of maximum at 75 degrees and $V_{ab}$ doing just the opposite. From 75 to 105 degrees, the situation is similar but inverted for $V_{ab}$ and $V_{de}$. Thus, across the sixty degree range from 45 to 105 electrical degrees, the variation in one of the torques producing total motor torque tends to cancel the variation of the other in their sum. This is repeated for the ranges controlled by other combinations of phases; and the torque ripple is thus further reduced by an additional factor of three: to about 2 percent of the total torque.

Some additional performance advantages are provided by the motor of this invention. The total torque for a given current level for the motor of FIG. 4 and 5 and for that of the prior art is shown in FIG. 10 and 9 respectively as the area under the solid line curves. The significant droop in the prior art curves in FIG. 9 can be contrasted with the smaller droop in the curves of FIG. 10, especially considering that the total torque of FIG. 10 is the sum of the two curves that are simultaneously solid at any phase angle. Thus, the motor of FIG. 4 and 5 has a greater total torque output for the same current. It also has a greater starting torque, which is indicated by the points of lowest total torque in the curves.

It should be apparent that the motor of this invention is not limited to the four pole, twenty-four slot embodiment shown in FIG. 4. Given a brushless DC motor having p poles, there must be 6*p*n slots in which to place the two groups of three-phase windings, where n is a non-zero, positive integer=1, 2, 3 . . . and 6*p*n is the product of 6, p and n. Thus, a two pole motor could use 12, 24, 36, . . . etc. slots; and a four pole motor could use 48 slots, for example, as well as the 24 slots shown in FIG. 4. A six pole motor would require at least 36 slots. In motors using more than 6*p slots (i.e. where n is greater than 1), multiple windings of the same phase are placed in adjacent slots to complete a full phase belt of 30 electrical degrees, as is done for a phase belt of 60 electrical degrees in the prior art three-phase motor of FIG. 3. For example, a two pole motor having 36 slots would provide 3 consecutive windings of each phase (A, A, A, D, D, D, C' . . . etc.), since each slot would cover 10 electrical degrees (and mechanical degrees—those skilled in the art are aware that each slot in a motor having p poles covers an electrical angle equal to p/2 times its mechanical angle). Of course, as the number of slots increases, the size of each slot decreases; and a practical limit is soon reached, especially in small motors. The skew of the motor will always be one slot pitch, regardless of the number of poles or slots.

I claim:

1. A motor vehicle having a source of electric power and an electric power steering system with a power assist actuator mechanically coupled for vibration transmission to a steering wheel, the actuator comprising a brushless DC motor having a permanent magnet rotor comprising p magnetic poles, where p is a positive, even integer, and a stator having 6*p*n slots containing windings, n being a positive, non-zero integer, the poles and slots being skewed with respect to each other by one slot pitch axially across the stator, the windings in the slots being electrically connected in two separate groups of overlapping three-phase windings with each group having a separate set of three phase terminals, the windings of each group being distributed in phase belts occupying alternate sectors of 30 electrical degrees and the phase belts of the first group alternating with the phase belts of the second group and being shifted therefrom by 30 electrical degrees, each of the slots containing windings from only one of the separate groups of overlapping three-phase windings, the power steering system further comprising a control effective to provide electric current to the phase terminals of each group of three-phase windings with a phase difference of 30 electrical degrees between the groups of three phase terminals so that each pair of phase terminals receives a torque producing current flow for a period of 60 electrical degrees centered on the rotor position of maximum back electromotive force generated across the pair of phase terminals, whereby vibration causing torque ripples due to variations in back electromotive force are 30 electrical degrees out of phase with each other and thus tend to at least partially cancel each other in the total torque output of the motor.

2. A brushless DC motor having a permanent magnet rotor comprising p magnetic poles, where p is a positive, even integer, and a stator having 6*p*n slots containing windings, where n is a positive, non-zero integer, the poles and slots being skewed with respect to each other by one slot pitch axially across the stator, the windings in the slots being electrically connected in two separate groups of overlapping three-phase windings with each group having a separate set of three phase terminals, the windings of each group being distributed in phase belts occupying alternate sectors of 30 electrical degrees and the phase belts of the first group alternating with the phase belts of the second group and being shifted therefrom by 30 electrical degrees, each of the slots containing windings from only one of the separate groups of overlapping three-phase windings.

3. The motor of claim 2 further comprising a source of electric power and a control effective to provide electric current to the phase terminals of each group of three-phase windings with a phase difference of 30 electrical degrees between the groups of three-phase terminals so that each pair of phase terminals receives a torque producing current flow for a period of 60 electrical degrees centered on the rotor position of maximum back electromotive force generated across the pair of phase terminals, whereby the torque ripples due to back electromotive force variation in the two groups of three-phase windings are 30 electrical degrees out of phase with each other and thus tend to at least partially cancel each other in the total torque output of the motor.

4. The motor of claim 3 in which the control comprises a pair of three-phase motor controls, each of the pair being connected to power a different one of the separate groups of three-phase windings.

* * * * *